(12) United States Patent
Deardorff et al.

(10) Patent No.: US 11,418,528 B2
(45) Date of Patent: Aug. 16, 2022

(54) DYNAMIC BEST PATH DETERMINATION FOR PENETRATION TESTING

(71) Applicant: Rapid7, Inc., Boston, MA (US)

(72) Inventors: Paul Deardorff, Durham, NC (US); Dustin Myers, Alexandria, VA (US)

(73) Assignee: Rapid7, Inc., Boston, MA (US)

( * ) Notice: Subject to any disclaimer, the term of this patent is extended or adjusted under 35 U.S.C. 154(b) by 639 days.

(21) Appl. No.: 16/178,705

(22) Filed: Nov. 2, 2018

(65) Prior Publication Data
US 2020/0145446 A1   May 7, 2020

(51) Int. Cl.
*H04L 9/40* (2022.01)

(52) U.S. Cl.
CPC .......... *H04L 63/1433* (2013.01); *H04L 63/20* (2013.01)

(58) Field of Classification Search
CPC .......................... H04L 63/1433; H04L 63/20
See application file for complete search history.

(56) References Cited

U.S. PATENT DOCUMENTS

| | | | | |
|---|---|---|---|---|
| 6,574,737 B1* | 6/2003 | Kingsford | ........... | H04L 63/1433 709/224 |
| 7,013,395 B1* | 3/2006 | Swiler | ........... | H04L 63/1433 713/151 |
| 2008/0256638 A1* | 10/2008 | Russ | ........... | G06F 21/577 726/25 |
| 2009/0077666 A1* | 3/2009 | Chen | ........... | G06Q 10/0631 726/25 |
| 2010/0100930 A1* | 4/2010 | King | ........... | H04L 63/1433 726/1 |
| 2011/0035803 A1* | 2/2011 | Lucangeli Obes | ........... | H04L 63/1433 726/25 |
| 2013/0074188 A1* | 3/2013 | Giakouminakis | ........... | H04L 63/1433 726/25 |
| 2014/0137257 A1* | 5/2014 | Martinez | ........... | H04L 63/1433 726/25 |
| 2014/0237606 A1* | 8/2014 | Futoransky | ........... | G06F 21/552 726/25 |
| 2014/0351940 A1* | 11/2014 | Loder | ........... | G06F 9/45558 726/25 |
| 2015/0058993 A1* | 2/2015 | Choi | ........... | G06N 7/005 726/25 |
| 2015/0381650 A1* | 12/2015 | Kaplan | ........... | G06F 21/577 705/14.11 |
| 2017/0279843 A1* | 9/2017 | Schultz | ........... | G06Q 40/08 |
| 2018/0219900 A1* | 8/2018 | Gorodissky | ........... | G06F 21/577 |

OTHER PUBLICATIONS

Greenwald et al., "Automated planning for remote penetration testing", Oct. 2009, IEEE Military Communications Conference, pp. 1-7 (Year: 2009).*

* cited by examiner

*Primary Examiner* — Kenneth W Chang
(74) *Attorney, Agent, or Firm* — Ashwin Anand

(57) ABSTRACT

Disclosed herein are methods, systems, and processes to facilitate and perform dynamic best path determination for penetration testing. An action path that includes a kill chain that involves performance of exploit actions for a phase of a penetration test is generated by identifying the exploit actions based on a penetration parameter, a detection parameter, and/or a time parameter associated with the exploit actions. Performance of the identified exploit actions permits successful completion of the phase of the penetration test and designates the action path for inclusion as part of a best path for the penetration test.

20 Claims, 11 Drawing Sheets

Best Path Determination Table 405

| Penetration Test Field 410 | Penetration Test Goal Field 415 | Penetration Parameter Field 420 | Detection Parameter Field 425 | Time Parameter Field 430 | Kill Chain Field 435 | Best Path Field 440 |
|---|---|---|---|---|---|---|
| Penetration Test 445(1) | Data Exfil from Node 145(8) | Data | Detection | 4 min., 15 sec. | Hops 330(1)(a) → 330(1)(d) → 330(1)(f) → 330(2)(b) | Action Path 320(1) in Phase 315(1) → Action Path 320(2) in Phase 315(2) |
| Penetration Test 445(2) | Credentials from Node 145(12) | Credentials | Artifacts | 45 sec. | Hops 330(1)(b) → 330(1)(h) → 330(2)(b) → 330(2)(g) | Action Path 320(2) in Phase 315(1) → Action Path 320(4) in Phase 315(2) |
| Penetration Test 445(3) | Exploit Node 145(5) | Exploit | Detection | 1 min., 35 sec. | Hops 330(1)(a) → 330(1)(b) → 330(1)(a) → 330(2)(b) | Action Path 320(1) in Phase 315(1) → Action Path 320(3) in Phase 315(2) |
| ... | ... | ... | ... | ... | ... | ... |

FIG. 4A

DYNAMIC BEST PATH DETERMINATION FOR PENETRATION TESTING

BACKGROUND

Field of the Disclosure

This disclosure is related to computer and network security. In particular, this disclosure is related to dynamic best path determination for penetration testing.

Description of the Related Art

Penetration testing involves an authorized simulated attack on a computer system to evaluate the security of the computer system. For example, penetration testing can identify security vulnerabilities, including the ability of potentially malicious actors to gain access to the computer system and/or associated storage devices and/or network infrastructure. A penetration test identifies a target computing system and a particular goal, and then undertakes various exploit actions to attain the goal. By doing so, the penetration test can determine whether the target computing system is vulnerable to attack if cybersecurity defenses were provisioned adequately, and which cybersecurity countermeasures, if any, the penetration test defeated.

A penetration test typically pits a red team (attacker) against a blue team (defender). The red team faces the trade-off of successfully achieving one or more goals (e.g., steps) of a penetration test with the risk of being discovered by the blue team (e.g., while performing exploit actions necessary to achieve said penetration testing goals). Red teams depend on human penetration testers to make decisions regarding performing (or not performing) exploit actions in a penetration test. For example, human actors on red teams routinely decide whether a particular exploit action (e.g., a penetration testing step) should be undertaken based on the desirability of getting closer to (or achieving) the penetration testing goal while at the same time evaluating the risk of being detected by the blue team. Unfortunately, human penetration testers typically place a greater value on not being detected by the blue team versus successfully progressing in a penetration test. Therefore, tasking human beings with making optimal risk versus reward decisions in penetration testing is undesirable.

SUMMARY OF THE DISCLOSURE

Disclosed herein are methods, systems, and processes for dynamic best path determination for penetration testing. One such method involves generating an action path for a phase of a penetration test. In this example, the action path includes a kill chain that involves performance of exploit actions, and generating the action path includes identifying the exploit actions based on a penetration parameter, a detection parameter, and/or a time parameter associated with each exploit action.

In one embodiment, the method determines that performance of the identified exploit actions permits successful completion of the phase of the penetration test and designates the action path for inclusion as part of a best path for the penetration test.

In another embodiment, the method performs a scan action to determine a topology of a network environment and stores the topology of the network environment that includes metadata associated with nodes operating in the network environment. In this example, the penetration test is performed by a penetration testing server that is not part of the network environment.

In some embodiments, the method generates a next action path for a next phase of the penetration test. In this example, the next action path is part of the kill chain and generating the next action path includes adjusting the penetration parameter, the detection parameter, and/or the time parameter based on the metadata and the designation of the action path. The method then identifies other exploit actions based on the adjusted penetration parameter, the adjusted detection parameter, and/or the adjusted time parameter.

In other embodiments, the method determines that performance of other exploit actions permits successful completion of the next phase of the penetration test and designates the next action path for inclusion as part of the best path for the penetration test.

In certain embodiments, the penetration parameter includes penetration attributes that include a data attribute, a credentials attribute, and an exploit attribute, the detection parameter includes a detection attribute, and the time parameter indicates an execution time attribute associated with performing the exploit actions. In this example, the penetration attributes are positive attributes and the detection and execution time attributes are negative attributes.

In one embodiment, determining that performance of the identified exploit actions permits successful completion of the phase of the penetration test includes receiving indication that the exploit actions identified as part of generating the action path result in a lowest risk of detection during performance of the penetration test.

In certain embodiments, generating the best path for the penetration test includes configuring the penetration testing server to schedule performance of the next action path after performance of the action path and modifying the kill chain based on the scheduling. In this example, the action path is one of several available action paths that permit successful completion of the phase of the penetration test, and performing the exploit actions included in the action path results in a lowest risk of detection during the penetration test compared to performing other exploit actions included in other action paths of the available action paths.

The foregoing is a summary and thus contains, by necessity, simplifications, generalizations and omissions of detail; consequently those skilled in the art will appreciate that the summary is illustrative only and is not intended to be in any limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features and advantages made apparent to those skilled in the art by referencing the accompanying drawings and/or figures.

FIG. 4A is a table 400A (e.g., a best path determination table 405) that can be used by a penetration testing server to determine a best path for penetration testing, according to one embodiment of the present disclosure.

Figure 1:
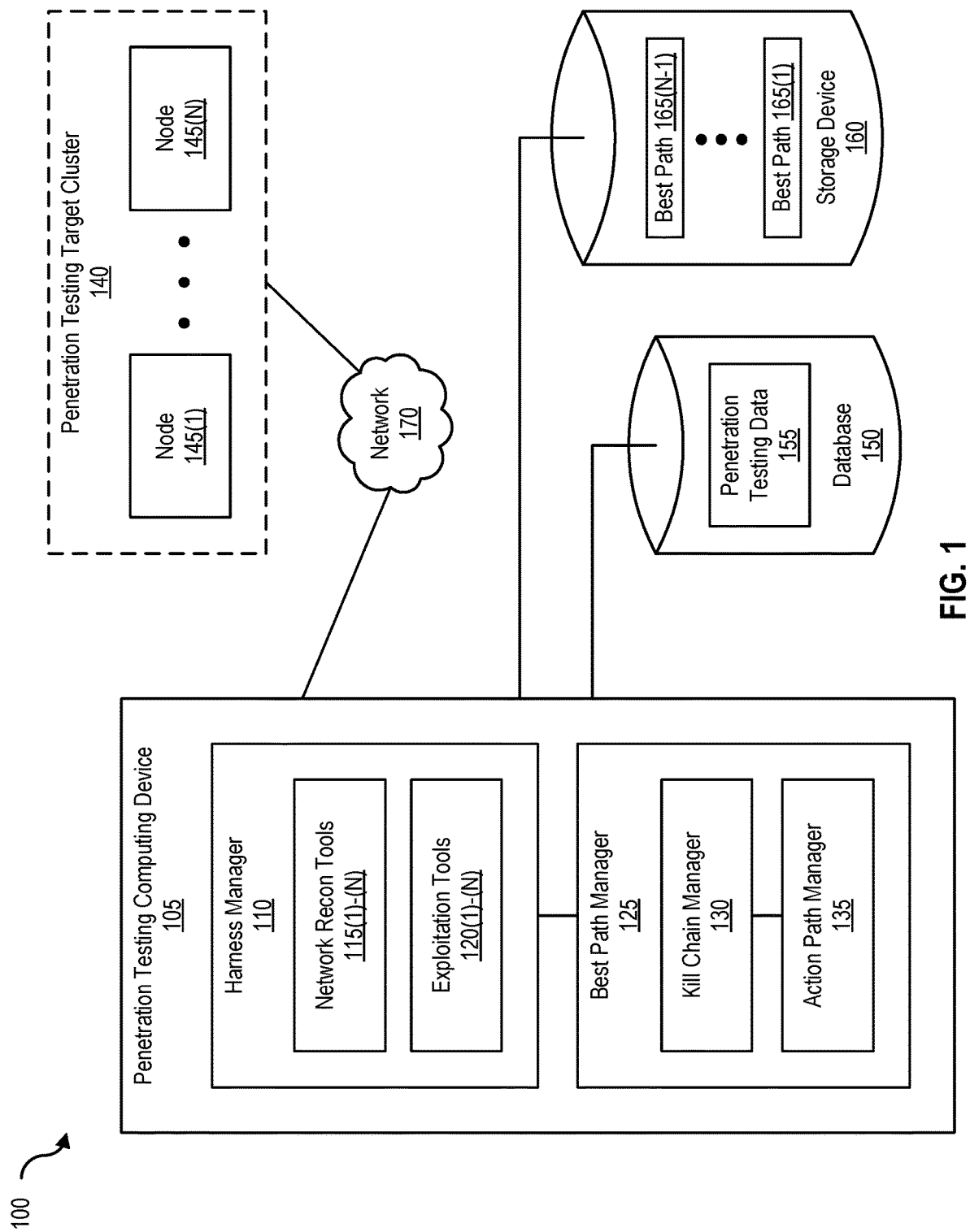
FIG. 1 is a block diagram 100 of a penetration testing computing device, according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

Modern businesses routinely face cybersecurity-related threats to their computing, storage, and/or network infrastructures (e.g., from malicious actors, hackers, rogue government entities, and the like). To counteract such threats and to implement appropriate and/or adequate countermeasures to potential malevolent attacks, businesses implement penetration testing measures aimed at accurately identifying exploitable risks in their computing, storage, and/or network environments.

Penetration testing measures are typically implemented in proportion to the complexity and size of a business. Locations that maintain sensitive data (e.g., storage devices), applications that store, process, and/or transmit such data, network connections, and/or access points are example of some computing entities that are generally included in a penetration test. A successful penetration test attempts to exploit security vulnerabilities and weaknesses in a computing environment to determine if unauthorized access to key computing systems and/or secure data can be achieved. If access is achieved, the vulnerability can be rectified and the penetration test can be re-performed until the subsequent penetration test is clean and no longer permits unauthorized access or other malicious activity.

Therefore, as previously noted, penetration testing involves an authorized simulated attack on a computer system to evaluate the security of the computer system to identify security vulnerabilities, including the ability of potentially malicious actors to gain access to the computer system and/or associated storage devices and/or network infrastructure. A penetration test intentionally targets one or more computing systems based on one or more goals (e.g., gaining access to a secure network, exfiltrating data from a storage device, and the like), and then undertakes one or more exploit actions (e.g., one or more steps and/or hops performed in one or more phases of a penetration test) to attain (or attempt to attain) the goal(s). By doing so, the penetration test can determine whether the targeted computing systems, network resources, storage devices, applications, and the like, are susceptible to malicious attack based on currently-implemented cybersecurity defenses, and which currently-implemented cybersecurity countermeasures the penetration test defeated (or was able to penetrate).

As previously noted, a penetration test pits a red team (e.g., one or more human attackers) against a blue team (e.g., one or more human defenders). The red team faces the trade-off of successfully achieving one or more goals (e.g., steps) of a penetration test with the risk of being discovered and/or detected by the blue team (e.g., while performing exploit actions necessary to achieve said penetration testing goals). Red teams depend on human penetration testers to make decisions regarding performing (or not performing) exploit actions in a penetration test. For example, human penetration testers on red teams routinely decide whether a particular exploit action (e.g., a penetration testing step) should be undertaken based on the desirability of getting closer to (or achieving) the penetration testing goal while at the same time evaluating the risk of being detected by the blue team.

Unfortunately, red team human penetration testers place a greater value on not being detected and/or discovered by the blue team versus risking detection and/or discovery to successfully progress in a penetration test and/or achieve one or more penetration testing goals. Therefore, because human (and emotional) bias against being caught (versus risking discovery to achieve a penetration testing goal) is inherent in human penetration testers, tasking human beings with making optimal risk versus reward decisions in penetration testing scenarios is undesirable and does not result in generation of the best possible action path in a penetration test.

In addition, current red team penetration testing is typically performed manually where individual scripts can only be used to perform repeated tasks. Existing penetration testing mechanisms also do not chain (e.g., logically join) penetration testing tasks (or steps) together and do not provide action path guidance in a structured and automated manner. The shortcomings of existing penetration testing methodologies are exacerbated, as noted, by human penetration testers who cannot be relied upon to make optimal risk versus reward penetration testing decisions because, also as noted, human penetration testers fear a loss more than they enjoy a win. Therefore, existing penetration testing practices cannot facilitate a calculated decision making process to generate a penetration testing action that takes into account the risk of detection versus the reward of progression without (human) emotional bias.

Disclosed herein are methods, systems, and processes for performing dynamic best path determination and/or kill chain determination in penetration testing.

Example Penetration Testing Computing System

FIG. 1 is a block diagram 100 of a penetration testing computing system, according to one embodiment. The penetration testing computing system of FIG. 1 includes at least a penetration testing computing device 105 and a penetration testing target cluster 140 communicatively coupled via network 160. Any type of network and/or interconnection other than (or in addition to) network 160 can be used to facilitate communication between penetration testing computing device 105 and penetration testing target cluster 140. Penetration testing target cluster 140 is a cluster of computing devices and/or computing systems (e.g., a corporate network and/or an enterprise networked computing environment) that are targets of one or more penetration tests and includes nodes 145(1)-(N). Nodes 145(1)-(N) and penetration testing computing device 105 can each be any of a variety of physical and/or virtual computing devices (e.g., a desktop, a laptop, a mobile device, a tablet, a virtual machine, a container, and the like).

As shown in FIG. 1, penetration testing computing device 105 includes at least a harness manager 110 and a best path manager 125. Harness manager 110 includes at least network recon tools 115(1)-(N) and exploitation tools 120(1)-(N) for performing network reconnaissance and exploitation, respectively (e.g., penetration testing system like Metasploit™, security scanner like Nmap, and the like). Harness manager 110 controls, launches, and executes network recon tools 115(1)-(N), exploitation tools 120(1)-(N), and action steps (e.g., on nodes 145(1)-(N) in penetration testing target cluster 140 that are part of network 160). In this example, actions steps include one or more exploit actions that are taken as part of a penetration test or as part of one or more phases of a penetration test.

Penetration testing computing device 105 is also communicatively coupled to at least a database 150 and a storage device 160. Database 150 stores information and/or data that is collected and/or learned from the computing environment of penetration testing target cluster 140 (e.g., penetration testing data 155 generated by harness manager 110 from nodes 145(1)-(N)) to inform future (e.g., yet to be taken) action steps. Storage device 160 can be any type of storage device and stores best paths 165(1)-165(N-1) in a hierarchical manner (e.g., a trained model with one or more preferred and/or optimal action steps (or hops) that include one or more exploit actions for performing a penetration test or one or more phases of a penetration test).

Red team human penetration testers typically spend a significant amount of time performing reconnaissance on an external attack surface of their targets (e.g., penetration testing target cluster 140) or on an internal network landscape (e.g., nodes 145(1)-(N)). In one embodiment, harness manager 110 automates external attack surface reconnaissance and/or internal network landscape reconnaissance using network recon tools 115(1)-(N). Harness manager 110 executes automated reconnaissance tasks and ingests data (e.g., penetration testing data 155) into a structured database (e.g., database 150) to facilitate decision making during one or more subsequent penetration testing phases (e.g., kill chain and/or action path determination, penetration testing phase analysis and modification, hop/step skipping and the like). For example, an initial reconnaissance phase may trigger an exploit and then loop back to another reconnaissance phase from this newly accessed vantage point. Therefore, harness manager 110 implements an automated system that significantly reduces the manual tasks and the laborious time involved in traditional red team operations.

With every action in a red team audit (e.g., a red team initiated penetration test) there is a risk of detection. Equally so, there are possible rewards in terms of learning something new about the targeted computing environment, gaining access to valuable information, exfiling data that has already been obtained, and the like. As noted, human actors cannot be relied upon in making optimal risk versus reward decisions in penetration tests (e.g., because they fear a loss more than they enjoy a win, emotional bias, and the like). Therefore, penetration testing computing device 105 includes best path manager 125 that implements an optimized penetration testing best path determination system that can eliminate human emotional bias and human errors during (red team) penetration tests.

To facilitate the optimization of the foregoing penetration testing best path determination, best path manager 125 includes at least a kill chain manager 125 and an action path manager 135. Kill chain manager 125 determines steps, tasks, and/or hops that must be taken in a penetration test (e.g., a kill chain) to achieve a penetration testing goal or make progress towards a penetration testing goal (e.g., complete a phase of a penetration test). For example, a kill chain to gain access to a secure server can involve two tasks, steps, or hops—first, from a computing device that initializes the penetration test to another intermediary computing device in the network, and then, from the intermediary computing device to the (target) secure server.

However, because human decision makers typically perform kill chain determination (e.g., the number of hops required, the wait time between hops, whether to terminate the kill chain between hops, and the like), red team penetration testing is susceptible to human emotional bias and human errors. Therefore, best path manager 125 also implements action path manager 135 in conjunction with kill chain manager 130 to determine an optimized action path for the kill chain—an action path that can be included as part of a best path to be undertaken by the penetration test. Therefore, best path manager 125 facilitates the modification of a kill chain prior to the kill chain being included in an action path, and action path manager 135 ensures that an optimized action path (whose steps, tasks, and/or hops associated with the kill chain can be adjusted in real time) is included in a best path for the penetration test, the performance of which has the greatest probability of achieving one or more penetration testing goals or successfully completing the (red team) penetration test (e.g., without being discovered).

Example Kill Chain Manager and Action Path Manager

Figure 2:
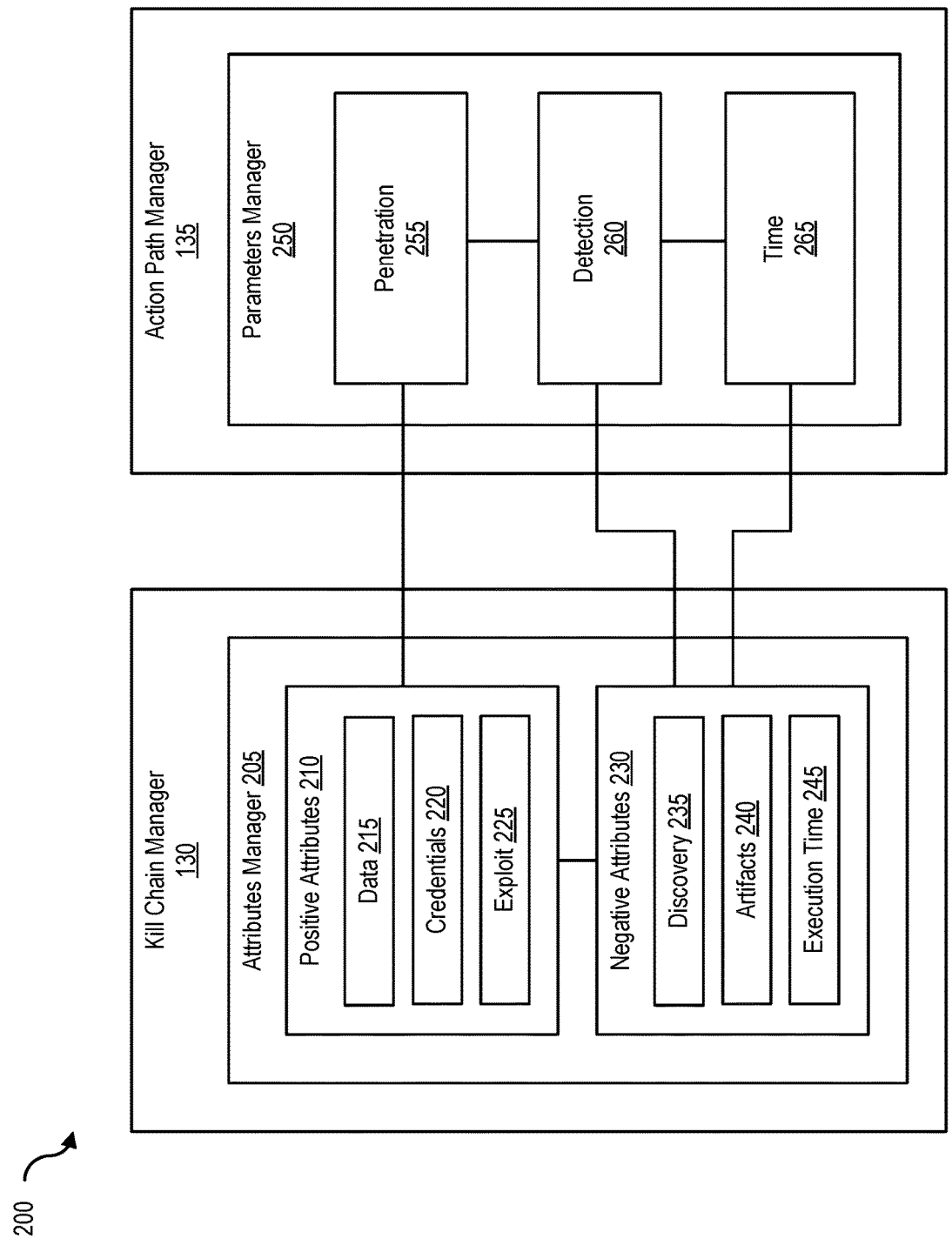
FIG. 2 is a block diagram 200 of a kill chain manager and an action path manager, according to one embodiment of the present disclosure.

FIG. 2 is a block diagram 200 of a kill chain manager and an action path manager, according to one embodiment. Kill chain manager 130 includes at least an attributes manager 205. Attributes manager 205 includes at least one or more positive attributes 210 and one or more negative attributes 230. Examples of positive attributes include data 215 (e.g., exfiltration), credentials 220 (e.g., passwords), and exploit 225 (e.g., malicious actions), and examples of negative attributes include discovery 235 (e.g., detection), artifacts 240, and execution time 245. Action path manager 135 includes at least a parameters manager 250 that further includes at least the following parameters—penetration 255, detection 260, and time 265.

Kill chain manager 130 and action path manager 135 can be used by penetration testing computing device 105 to determine a "best path" penetration test against a given network environment (e.g., penetration testing target cluster 140). In certain embodiments, best path manager 125 assigns each possible action step in the penetration test a value (e.g., a numerical or probabilistic score) computed based on a benefit of action path determination that takes into account risks and rewards of each step or hop in the kill chain. In this example, kill chain manager 130 and action path manager 135 can be trained and optimized by human actors that typically carry out a (red team) network penetration test.

In one embodiment, the diversity of penetration testing target cluster 140 (e.g., a network environment) lends itself to an adaptable best path manager 125 that can learn from the network environment and improve over time. In this example, best path manager 125 can be trained and supervised by real-life human penetration testers and can develop patterns on reconnaissance and exploit techniques performed on penetration testing target cluster 140. A human penetration tester, for instance, might start with an external domain search to identify publicly facing web assets. Next, the human penetration tester may choose to scan the web assets for common (security) vulnerabilities and determine what types of defenses are in place that might prevent an attack and/or generate an attack alert. Once vulnerabilities are identified, the most promising of the identified vulnerabilities that expose the highest level of privileged access would be targeted for exploitation to gain access into the (target) internal network. Best path manager 125 can learn from this manual process and can replicate the process with programmatic steps and phases, analyzing the risk and reward of taking (or not taking) further action (e.g., one or more next steps or hops) at each step (or hop).

As noted, attributes manager 205 includes positive attributes such as data, credentials, and exploit(s), and negative attributes such as discovery, artifacts, and execution time. Positive attributes are penetration testing goals that weigh in favor of taking a step or performing a hop in a penetration test and negative attributes are penetration testing goals that weight against taking a step or performing a hop in the penetration test. For example, positive attributes such as exfiltrating data, gaining access to credentials, and/or performing an exploit action are attributes that are weighed positively by kill chain manager 130, and negative attributes such as being discovered (or detected), gaining access to mere artifacts, and a lengthy execution time (e.g., of hops, steps, or tasks) are weighed negatively by kill chain manager 205. As shown in FIG. 2, data 215, credentials 220, and exploit 225 are penetration parameters (e.g., penetration 255) that are controlled by parameters manager 250 and discovery 235, artifacts 240, and execution time 245 are detection and time parameters (e.g., detection 260 and time 265) that are controlled by parameters manager 250. Because action path manager 135 implements parameters manager 250 that can adjust and/or modify an action path in real time based on parameters such as penetration, detection, and time in conjunction with corresponding attributes (e.g., positive attributes 210 and negative attributes 230), action path manager 135 can generate an (optimized) action path for a best path penetration test (e.g., by taking into account the risks and rewards of each step in a kill chain).

Example of Performing a "Best Path" Penetration Test

Figure 3A:
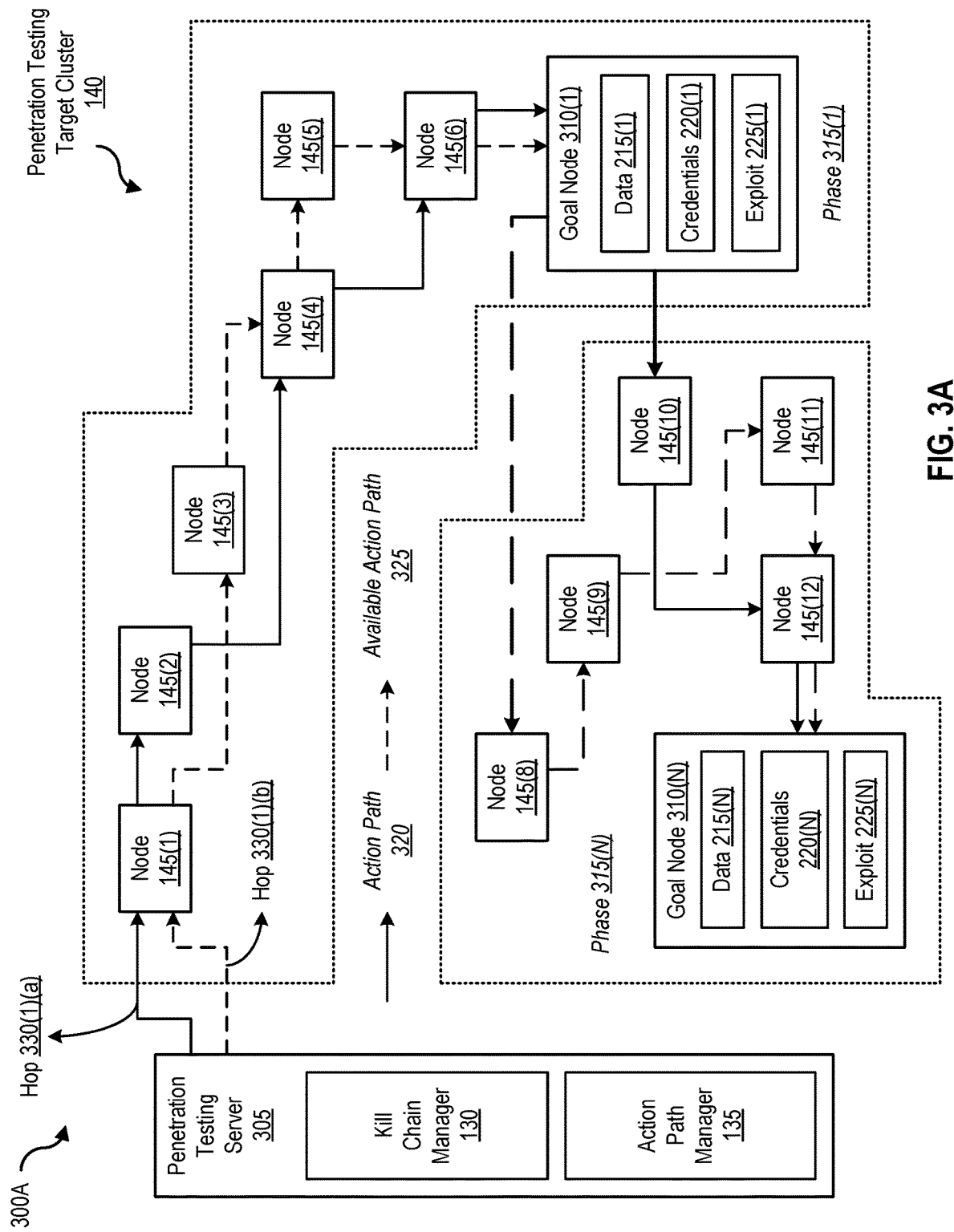
FIG. 3A is a block diagram 300A of a penetration testing server generating a best path, according to one embodiment of the present disclosure.

FIG. 3A is a block diagram 300A of a penetration testing server generating a best path, according to one embodiment. As shown in FIG. 3A, action path manager 135 generates an action path (e.g., action path 320) for a phase (e.g., phase 315(1)) of a penetration test that includes a kill chain that involves performance of exploit actions. In this example, generating the action path includes identifying the exploit action(s) based on a penetration parameter, a detection parameter, and/or a time parameter associated with each exploit action (e.g., associated with each hop such as hop 330(1)(a) that is part of action path 320 or hop 330(1)(b) that is part of an available action path 325). Penetration testing server 305 then determines that performance of the identified exploit action permits successful completion of the phase of the penetration test (e.g., phase 315(1)) and designates the action path for inclusion as part of a best path for the penetration test.

In one embodiment, penetration testing server 305 performs a scan action to determine a topology of a network environment and stores the topology of the network environment that includes metadata associated with one or more nodes operating in the network environment. For instance, harness manager 110 performs a scan action (e.g., using one or more of network recon tools 115(1)-(N)) to determine the topology of penetration testing target cluster 140 and stores metadata associated with one or more of nodes 145(1)-(N) (e.g., as penetration testing data 155). In this example, the penetration test is performed by a penetration testing server that is not part of the network environment (e.g., penetration testing server 305 is not part of penetration testing target cluster 140).

In another embodiment, action path manager 135 generates a next action path for a next phase of the penetration test (e.g., phase 315(N)). In this example, the next action path (e.g., the part of action path 320 or available action path 325 that transitions from phase 315(1) to phase 315(N)) is part of the kill chain and generating the next action path includes adjusting (or modifying) the penetration parameter, the detection parameter, and/or the time parameter based on the metadata and the designation of the action path (e.g., the previous designation). Best path manager 125 then identifies other exploit actions based on the adjusted penetration parameter, the adjusted detection parameter, and/or the adjusted time parameter (e.g., exploit actions that reflect the changed action path in the kill chain necessitated by the adjusted parameters).

In some embodiments, penetration testing server 305 determines that performance of the other exploit actions permits successful completion of the next phase of the penetration test and designates the next action path for inclusion as part of the best path for the penetration test (e.g., phase 315(N)). For example, determining that performance of the identified exploit actions permits successful completion of a phase of the penetration test includes receiving indication (e.g., from action path manager 135) that the exploit actions identified as part of generating the action path result in a lowest risk of detection during performance of the penetration test (e.g., the lowest risk of detection in gaining access to goal node 310(N) for data exfiltration, credential gathering, or other exploit action).

In certain embodiments, generating the best path for the penetration test includes configuring penetration testing server 305 to schedule performance of the next action path after performance of the action path and modifying the kill chain based on the scheduling. In this example, the action path is one of several available action paths that permit successful completion of the phase of the penetration test, and performing the exploit actions included in the action path results in a lowest risk of detection during the penetration test compared to performing other exploit actions included in other action paths of the available action paths.

For example, in one embodiment, based on kill chain and action path analysis performed by kill chain manager 130 and action path manager 135 (as discussed in reference to FIG. 2), penetration testing server 305 can determine that a penetration test should start at phase 315(1) using available action path 325 (indicated by dashed lines in FIG. 3A that starts with hop **330(1)(*b*)) and can then schedule action path 320 as the next action path for phase 315(N) after goal node 310(1) (e.g., node 145(7)) has been reached for the performance of one or more exploit actions (e.g., with an eventual goal of accessing goal node 310(N) as part of completing the penetration test and successfully achieving the penetration testing goals). On the contrary, in another embodiment, penetration testing server 305 can also determine that the penetration test should start at phase 315(1) using action path 320 (indicated by bold lines in FIG. 3A that starts with hop 330(1)(*a*)) and can then schedule available action path 325 as the next action path for phase 315(N) after goal node 310(1) has been reached for the performance of one or more exploit actions (e.g., with an eventual goal of accessing goal node 310(N) (e.g., node 145(13)**) as part of completing the penetration test and successfully achieving the penetration testing goals).

In this manner, penetration testing server 305 can perform action path selection (and inclusion in a best path) based on analyzing penetration testing parameters and corresponding positive and negative attributes (as shown in FIG. 2) at each step (or hop) in a penetration test. For example, with respect to FIG. 3A, which illustrates an example penetration test, penetration testing server 305 can perform hop **330(1)(*a*) and then determine that the next step or hop of an action path or available action path must switch to a different phase or different node altogether. Because next step analysis is performed at each hop (and for each subsequent available or possible) step, penetration testing server 305** can constantly adjust and optimize a future action path, thus facilitating the provision of a best path for the penetration test in real time.

In some embodiments, before performing an automated "best path" penetration test, penetration testing server 305 permits the configuration and adjustment of parameters in parameters manager 250 in order to define weights (or importance) for desired (penetration testing) outcomes of the penetration test. For instance, a user can configure penetration testing server 305 with one or more boundaries (e.g., network segments or hosts to avoid, and the like). In this example, various outcomes of the penetration test can include data exfiltration, access to sensitive information, or disruption of operations, where each of the foregoing outcomes can be configured with a different weight or importance in parameters manager 250 (e.g., as positive attributes). Likewise, negative attributes such as the permitted (or desired) execution time of the penetration test can also be configured using parameters manager 250. For example, a very short time frame might require penetration testing server 305 to take more risks (e.g., of being discovered) when traversing penetration testing target cluster 140 where as a longer time horizon would permit for passive observation of penetration testing target cluster 140 and tailor techniques in order to blend in with normal traffic that may go unnoticed by a network monitor.

Therefore, in certain embodiments, penetration testing server 305 performs dynamic best path determination and/or dynamic kill chain determination for penetration testing at least by: (1) determining the next step and/or subsequent hop available to an (existing/ongoing) action path among several available action paths, and (2) permitting the adjustment and configuration of penetration testing parameters (e.g., positive attributes and negative attributes as shown in FIG. 2) based on penetration testing goals (e.g., which may be different for different computing environments and security-related considerations).

Example Reconnaissance and Attack Steps Using a Dynamic Best Path

Figure 3B:
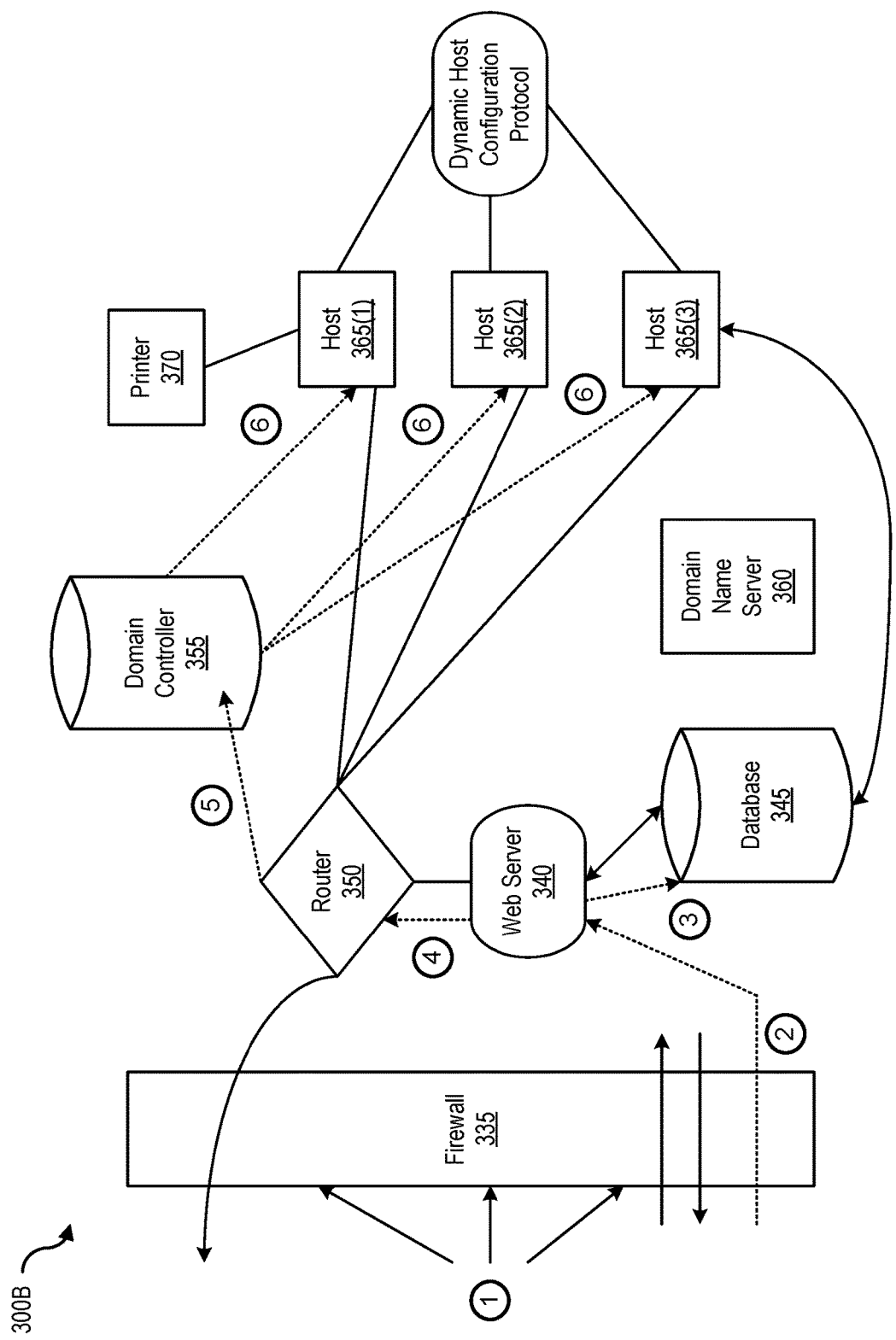
FIG. 3B is a block diagram 300B of a best path penetration test, according to one embodiment of the present disclosure.

FIG. 3B is a block diagram 300B of a best path penetration test, according to one embodiment. The example penetration test of FIG. 3B is performed using a dynamically generated best path and includes at least six steps. In step 1, an external scan that attempts to understand the attack surface of the computing environment from the outside is performed by penetration testing server 305. External scans are often inhibited by a firewall, but certain services (e.g., a web server) are typically accessible from outside the network and thus, web-related ports are open. In this example, penetration testing server 305 identifies web server 340 in the external scan.

In step 2, the externally facing web server exposes a vulnerability. Penetration testing server 305 utilizes a catalog of known vulnerabilities and exploits to gain access to web server 340. Web server 340 is connected to a database 345. In step 3, penetration testing server 305 scans the penetration testing cluster from the vantage of web server 340 and notices database 345, scans database 345 for sensitive financial and/or personal data, and extracts such data. After gaining access to web server 340, penetration testing server 305 notices a router 350 (e.g., a router that developers have hooked up to web server 340 for debugging and shell access).

In step 4, penetration testing server 305 implants itself onto router 350 to monitor and observer what "normal" network traffic looks like (e.g., via an exploit or by using captured credentials). In this example, the waiting period rolls into the kill chain analysis and the action path analysis performed by kill chain manager 130 and action path manager 135, respectively (e.g., as a negative attribute (e.g., execution time 245) and as a parameter (e.g., time 265), as waiting time increases the chance of detection but also increases the ability of penetration testing server 305 to blend into the aforementioned normal traffic).

In one embodiment, penetration testing sever 305 waits for a period of time (e.g., 10 seconds, 20 seconds, 1 minute, and the like) to determine a baseline (e.g., normal and/or expected network traffic and/or network behavior) and looks for specific patterns (e.g., network traffic flow, device interaction, computing resource availability, and the like) that can be taken advantage of to optimally blend in with the network environment (e.g., exfiltrating data during the same time as scheduled backup operation or deduplication routine, credential gathering while users are gone for the day, and the like).

In step 5, after gaining access to router 350, penetration testing server 305 notices that router 350 is connected to a domain controller (e.g., domain controller 355) that stores user names and credentials for hosts in a local domain group (e.g., hosts 365(1)-(3)). In this example, domain controller 355 provides a valuable source of credentials for other hosts on the network. In step 6, penetration testing server 305 scans the new hosts over a certain interval of time in order to not trip any known endpoint protection agents or sensors. With valid credentials from domain controller 355, penetration testing server 305 can perform a remote login to the host during a login time that is common to the host itself (e.g., during working hours, and the like).

Example Best Path Determination Table

FIG. 4 is a table 400 (e.g., a best path determination table 405) that can be used by a penetration testing server to determine a best path for penetration testing, according to one embodiment. As shown in FIG. 4, a best path determination table 405 includes at least a penetration test field 410, a penetration test goal field 415, a penetration parameter field 420, a detection parameter field 425, a time parameter field 430, a kill chain field 435, and a best path field 440. Best path determination table 405 can be used by penetration testing server 305 to dynamically determine a best path for penetration testing.

In one embodiment, penetration test 445(1) has a goal of exfiltrating data from node 145(8) (e.g., as shown in FIG. 3A). The penetration parameter (e.g., penetration 255) with the corresponding positive attribute is data 215 and the detection parameter (e.g., detection 260) with the corresponding negative attribute is discovery 235. In this example, the time parameter (e.g., time 265) with the corresponding negative attribute is execution time 245, which in this case, is 4 minutes and 15 seconds. Kill chain manager 130 determines that hops 330(1)(a)→330(1)(d)→330(1)(f)→330(2)(b) are the steps required in the kill chain for penetration test 445(1) and action path manager 135 determines that action path 320(1) in phase 315(1) and action path 320(2) in phase 315(2) are required to accomplish the hops or steps of the kill chain that permits and/or facilitates the greatest possibility of achieving the goal(s) of the penetration test while at the same time providing the lowest risk of being detected and/or discovered while performance of the penetration test. Best path manager 135 then includes (or designates for inclusion) the foregoing action paths and corresponding hops in a "best path" for the penetration test.

In some embodiments, penetration test 445(2) has a goal of getting credentials from node 145(12) (e.g., as shown in FIG. 3A). The penetration parameter (e.g., penetration 255) with the corresponding positive attribute is credentials 220 and the detection parameter (e.g., detection 260) with the corresponding negative attribute is artifacts 240. In this example, the time parameter (e.g., time 265) with the corresponding negative attribute is execution time 245, which in this case, is 45 seconds. Kill chain manager 130 determines that hops 330(1)(b) → 330(1)(h) → 330(2)(b) → 330(2)(g) are the steps required in the kill chain for penetration test 445(2) and action path manager 135 determines that action path 320(2) in phase 315(1) and action path 320(4) in phase 315(2) are required to accomplish the hops or steps of the kill chain that permits and/or facilitates the greatest possibility of achieving the goal(s) of the penetration test while at the same time providing the lowest risk of being detected and/or discovered while performance of the penetration test. Best path manager 135 then includes (or designates for inclusion) the foregoing action paths and corresponding hops in a "best path" for the penetration test.

In other embodiments, penetration test 445(3) has a goal of exploiting node 145(5) (e.g., as shown in FIG. 3A). The penetration parameter (e.g., penetration 255) with the corresponding positive attribute is exploit 225 and the detection parameter (e.g., detection 260) with the corresponding negative attribute is discovery 235. In this example, the time parameter (e.g., time 265) with the corresponding negative attribute is execution time 245, which in this case, is 1 minute and 35 seconds. Kill chain manager 130 determines that hops 330(1)(a) → 330(1)(b) → 330(1)(a) → 330(2)(b) are the steps required in the kill chain for penetration test 445(3) and action path manager 135 determines that action path 320(1) in phase 315(1) and action path 320(3) in phase 315(2) are required to accomplish the hops or steps of the kill chain that permits and/or facilitates the greatest possibility of achieving the goal(s) of the penetration test while at the same time providing the lowest risk of being detected and/or discovered while performance of the penetration test. Best path manager 135 then includes (or designates for inclusion) the foregoing action paths and corresponding hops in a "best path" for the penetration test.

Therefore, in this manner, best path determination table 405 can be utilized by penetration testing server 305 to at least (1) determine the hops (or steps) between one or more nodes required by a kill chain and (2) determine one or more actions paths and one or more phases to be included in (or designated to) an optimized best path for a penetration test.

Example of Iterative Best Path Determination for Penetration Testing

In certain embodiments, execution of one or more hops/steps (e.g., a scan or exploit action) that are part of one or more action paths in one or more phases of a penetration test can be performed in an iterative manner by re-storing network topology information after each iteration of action path execution (or even after each iteration of a hop or penetration testing step). For example, after a scan or exploit action has been performed as part of an action path of the penetration test, the availability of newly-generated network topology information can be utilized by best path manager 125 to determine an updated kill path and/or an updated action path (e.g., for one or more next or subsequent hop(s)). In some embodiments, best path manager 125 performs a check for each iteration to determine whether an (end) goal of the penetration test has been met or whether the (end) goal of the penetration test can be met with (computing) resources (available) on the current host (or whether a new host is necessary).

Figure 4B:
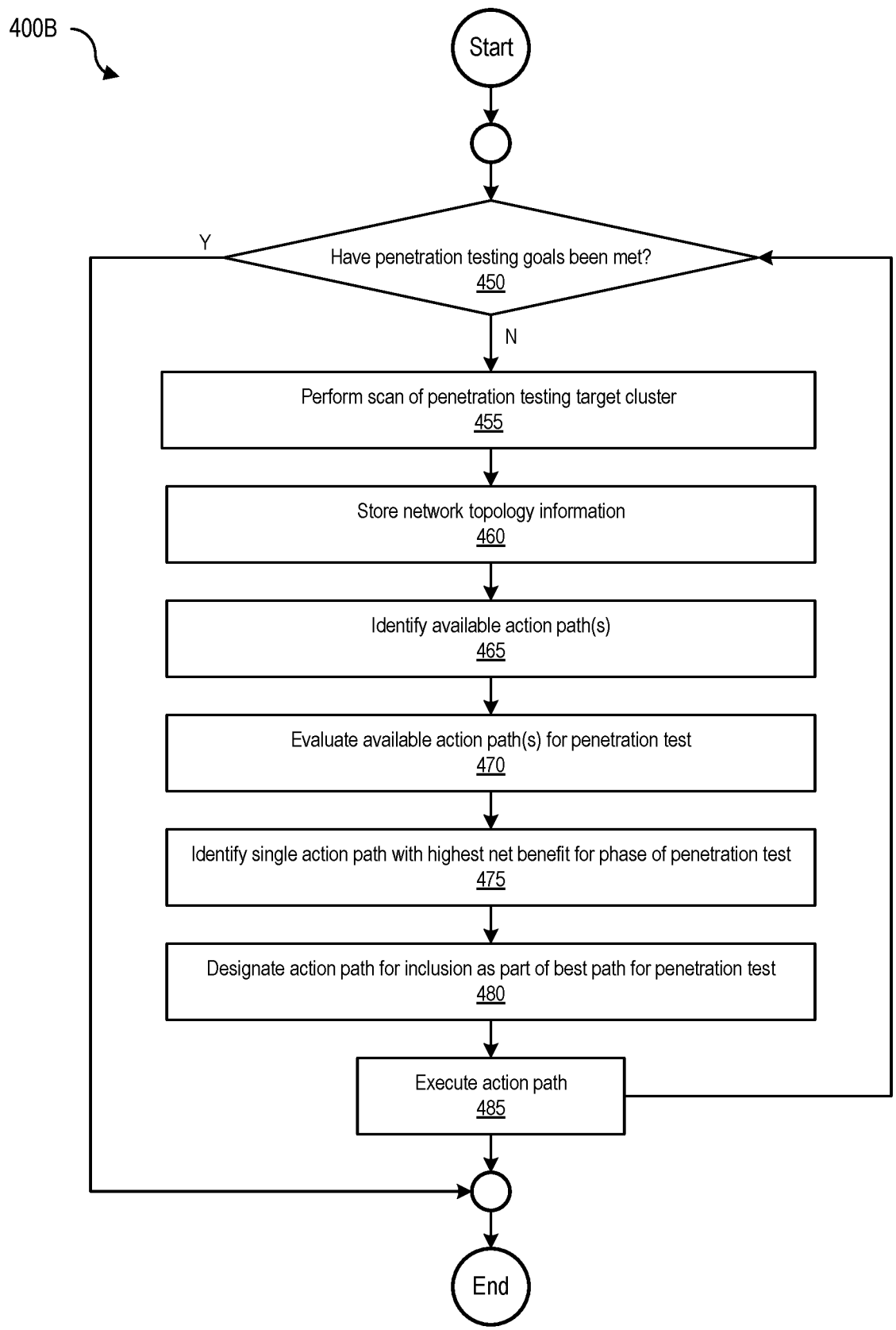
FIG. 4B is a flowchart 400B of a process for dynamic best path determination for penetration testing, according to one embodiment of the present disclosure.

FIG. 4B is a flowchart 400B of a process for performing dynamic best path determination for penetration testing in an iterative manner, according to one embodiment. The process begins at 450 by determining whether penetration testing goals have been met. If penetration testing goals have been met, the process ends. If penetration testing goals have not been met, the process, at 455, performs a scan (e.g., of penetration testing target cluster 140). At 460, the process stores network topology information (e.g., penetration testing data 155).

At 465, the process identifies available action path(s) (e.g., using kill chain manager 130 and action path manager 135), and at 470, evaluates (the) available action path(s) for the penetration test (e.g., based on one or more (specific) goals of the penetration test such as data exfiltration, credential recovery, performing an exploit action, and the like). At 475, the process identifies a single action path with the highest net benefit for a phase (e.g., a current phase) of the penetration test, and at 480, designates the (identified single) action path for inclusion as part of the "best path" for the penetration test.

At 485, the process executes the action path and loops back to 450 to determine whether the penetration testing goals have (now) been met. If the penetration testing goals have not been met, the process re-performs steps 455-485 as shown in FIG. 4B. However, if the penetration testing goals have been met, the process ends.

Example Processes for Dynamic Best Path Determination for Penetration Testing

Figure 5:
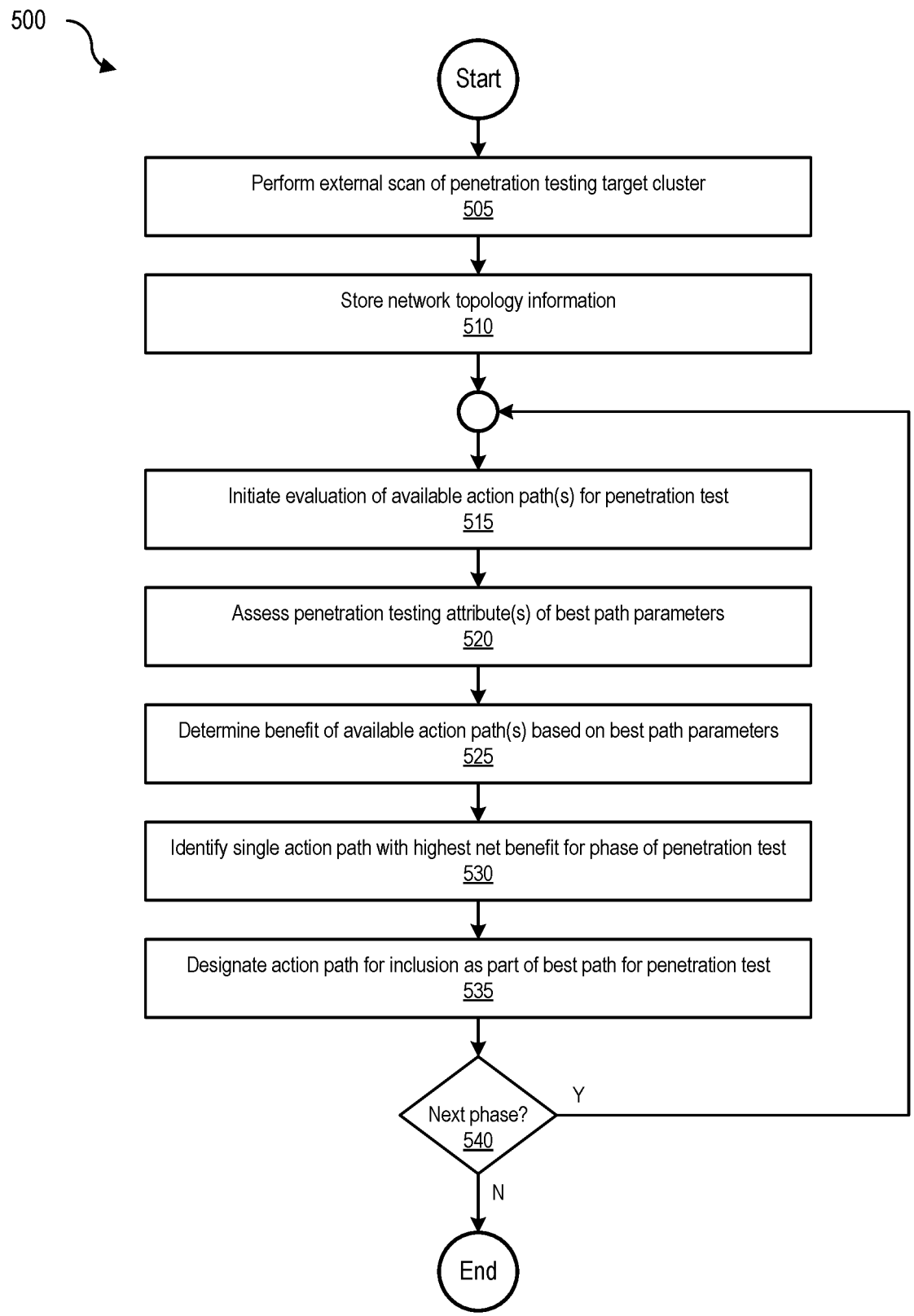
FIG. 5 is a flowchart 500 of a process for designating an action path for inclusion as part of a best path, according to one embodiment of the present disclosure.

FIG. 5 is a flowchart 500 of a process for designating an action path for inclusion as part of a best path, according to one embodiment. The process begins at 505 by performing an external scan of a penetration testing target cluster. For example, penetration testing server 305 performs an external scan of penetration testing target cluster 140 (e.g., as shown in FIG. 3B). At 510, the process stores network topology information (e.g., as part of penetration testing data 145 in database 140), and at 515, initiates evaluation of available action path(s) for a penetration test (e.g., action path 320 or available action path 325).

At 520, the process assesses (or accesses) penetration testing attributes of best path parameters (e.g., positive attributes 210 and negative attributes 230), and at 525, determines the benefit of available action path(s) based on the best path parameters. For example, in one embodiment, the benefit of an available action path is a reward (e.g., data, credentials, and/or exploit) adjusted (downward or negatively) for a risk (e.g., detection and/or artifacts) and further adjusted (downward or negatively) based on a time penalty (e.g., a lengthy execution time). Therefore, the benefit of an available action path can be calculated by adjusting values for one or more penetration parameters based on values for detection parameters and values for a time parameter (e.g., (Penetration)–(Detection)–(Time Penalty)=Benefit of Action Path).

At 530, the process identifies a single action path with the highest (net) benefit for a phase of the penetration test, and at 535, designates the (identified) action path for inclusion as part of the best path for the penetration test. At 540, the process determines whether there is another phase. If there is another phase, the process loops to 515. Otherwise, the process ends.

Figure 6:
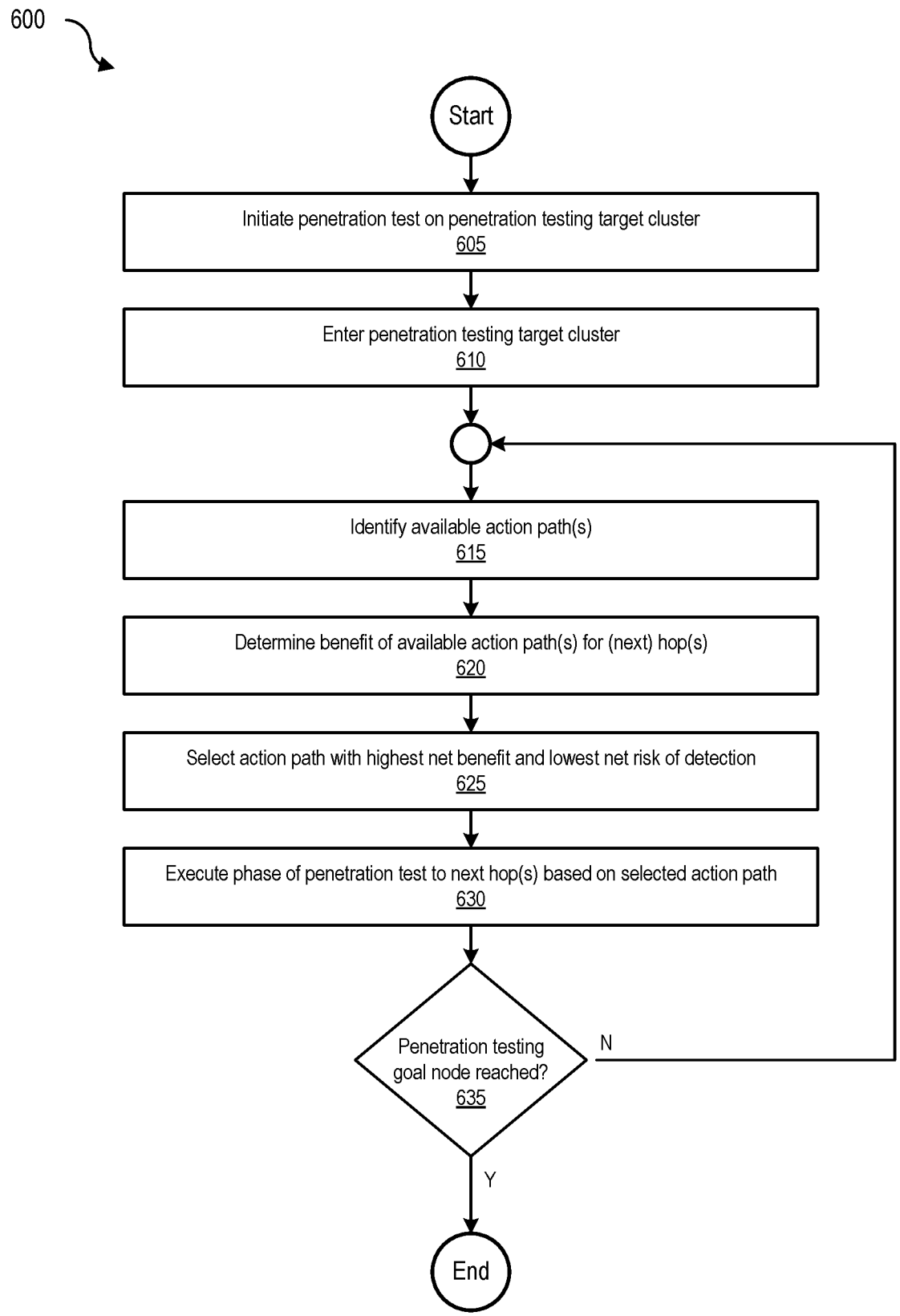
FIG. 6 is a flowchart 600 of a process for executing a phase of a penetration test based on a selected action path, according to one embodiment of the present disclosure.

FIG. 6 is a flowchart 600 of a process for executing a phase of a penetration test based on a selected action path, according to one embodiment. The process begins at 605 by initiating a penetration test on a penetration testing target cluster (e.g., penetration testing target cluster 140), and at 610, enters the penetration testing target cluster. At 615, the process identifies available action paths, and at 620, determines the benefit of (each) available action path for next (or subsequent) hops (or steps) (e.g., (Penetration)–((Detection)+(Time Penalty))). In one embodiment, the process only determines the benefit of one available action path or a subset of available action paths based on penetration testing goals and penetration testing data 145.

At 625, the process selects the action path with the highest net benefit (e.g., of successfully attaining one or more goals of a penetration test) and the lowest net risk of detection. For example, an action path with the highest absolute benefit may not be selected if such an action path has a corresponding high risk of detection. Therefore, the action path selection is based on the highest net benefit and the lowest net risk (of detection). At 630, the process executes the phase of the penetration test to the next hop(s) based on the selected action path. At 635, the process determines if a penetration testing goal node has been reached. If the penetration testing goal node has not been reached, the process loops to 615. Otherwise, the process ends.

Figure 7:
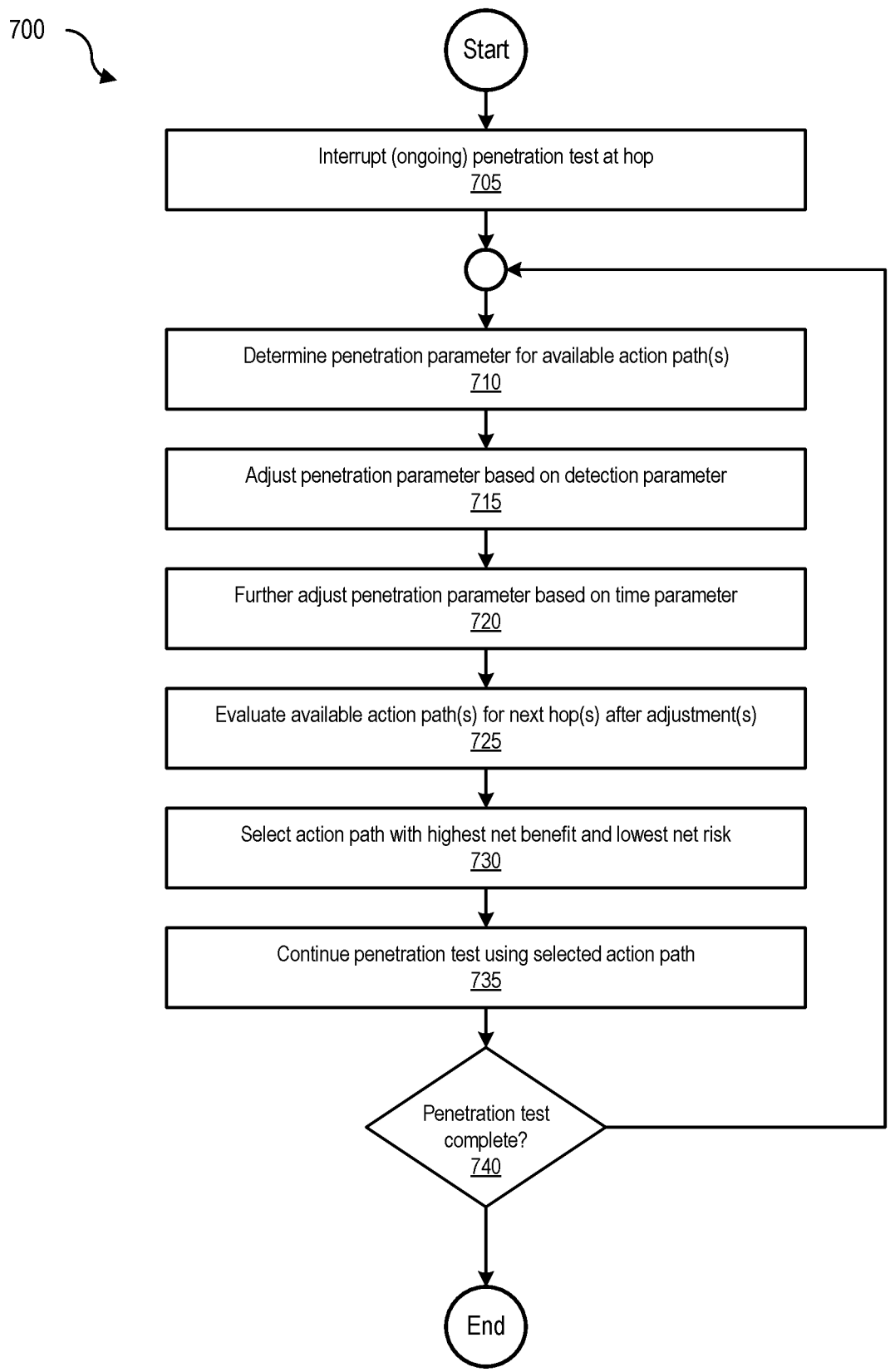
FIG. 7 is a flowchart 700 of a process for selecting an action path with the highest net benefit, according to one embodiment of the present disclosure.

FIG. 7 is a flowchart 700 of a process for selecting an action path with the highest net benefit, according to one embodiment. The process begins at 705 by interrupting an (ongoing) penetration test (e.g., at a given hop or after a given hop). At 710, the process determines one or more penetration parameters for available action paths (e.g., data, credentials, and/or exploit(s)) and at 715, adjusts the penetration parameter based on a detection parameter (e.g., discovery). At 720, the process further adjusts the penetration parameter based on a time parameter (e.g., an execution time).

At 725, the process evaluates available action paths for next (or subsequent) hops after the foregoing (parameter) adjustments, and at 730, selects the action path with the highest (net) benefit and lowest (net) risk. At 735, the process continues the penetration test (e.g., performs the hops or steps identified by best path manager 125) using the selected action path. At 740, the process determines whether the penetration test is complete. If the penetration test is incomplete, the process loops to 710. Otherwise, the process ends.

Therefore, it will be appreciated that the methods, processes, and systems described herein minimize (or eliminate) human emotional bias and human errors in penetration testing by facilitating dynamic best path determination for penetration testing. By adjusting penetration parameters, detection parameters, and a time parameter, and corresponding (positive and negative) attributes at each hop or step in a penetration test, the best (available) action path is chosen (or selected) for subsequent progression of a penetration test and for inclusion as part of a best path for the penetration test (while at the same time accounting for network topology, baseline conditions, penetration testing goals, and the like).

Example Computing Environment

Figure 8:
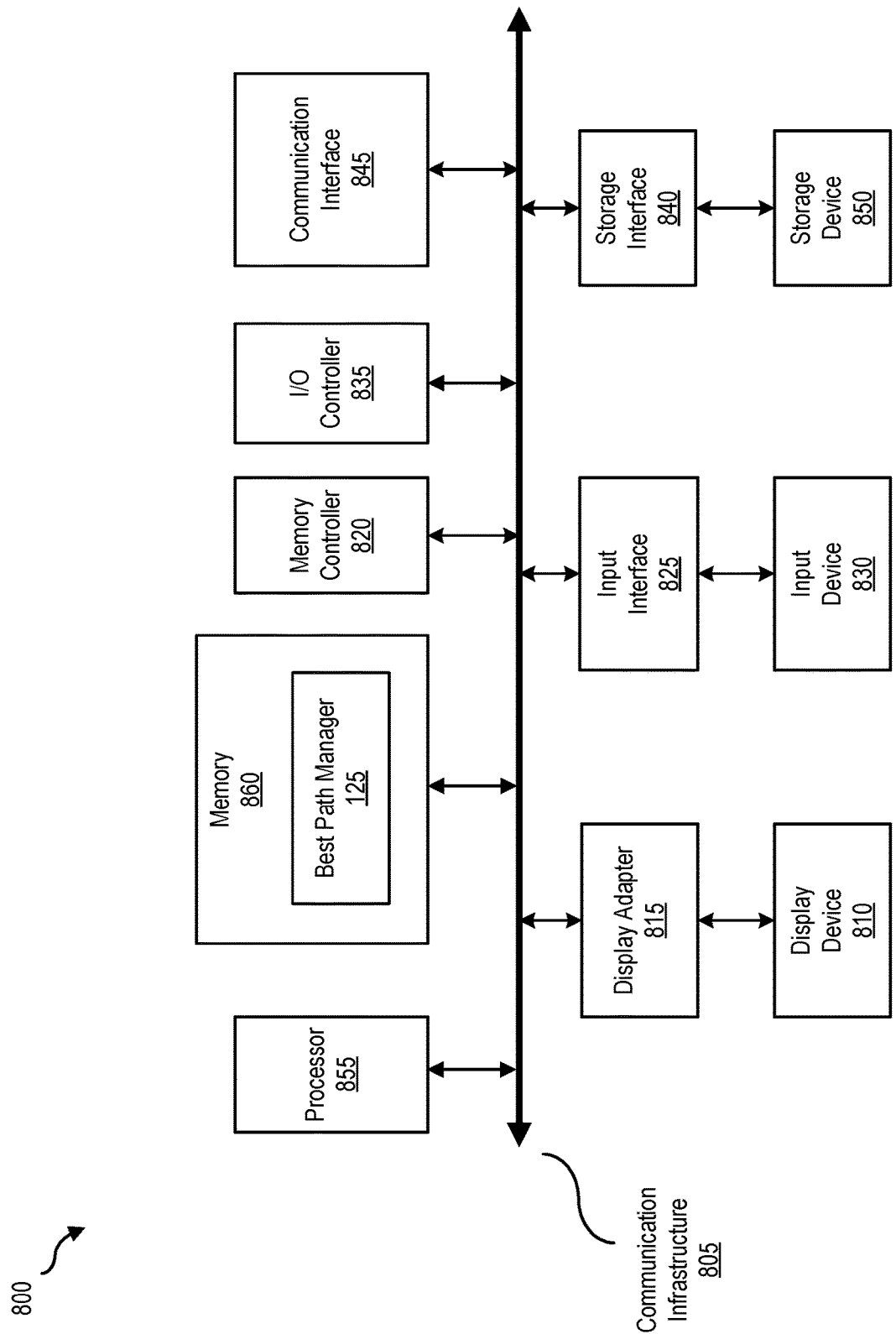
FIG. 8 is a block diagram 800 of a computing system, illustrating how a best path manager can be implemented in software, according to one embodiment of the present disclosure.

FIG. 8 is a block diagram 800 of a computing system, illustrating how a best path manager can be implemented in software, according to one embodiment. Computing system 800 can include penetration testing computing device 105 or penetration testing server 305 and broadly represents any single or multi-processor computing device or system capable of executing computer-readable instructions. Examples of computing system 800 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 800 may include at least one processor 855 and a memory 860. By executing the software that executes best path manager 125, computing system 800 becomes a special purpose computing device that is configured to perform dynamic best path determination for penetration testing.

Processor 855 generally represents any type or form of processing unit capable of processing data or interpreting and executing instructions. In certain embodiments, processor 855 may receive instructions from a software application or module. These instructions may cause processor 855 to perform the functions of one or more of the embodiments described and/or illustrated herein. For example, processor 855 may perform and/or be a means for performing all or some of the operations described herein. Processor 855 may also perform and/or be a means for performing any other operations, methods, or processes described and/or illustrated herein. Memory 860 generally represents any type or form of volatile or non-volatile storage devices or mediums capable of storing data and/or other computer-readable instructions. Examples include, without limitation, random access memory (RAM), read only memory (ROM), flash memory, or any other suitable memory device. In certain embodiments computing system 800 may include both a volatile memory unit and a non-volatile storage device. In one example, program instructions implementing best path manager 125 may be loaded into memory 860.

In certain embodiments, computing system 800 may also include one or more components or elements in addition to processor 855 and/or memory 860. For example, as illustrated in FIG. 8, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device. Examples of communication infrastructure 805 include, without limitation, a communication bus (such as an Industry Standard Architecture (ISA), Peripheral Component Interconnect (PCI), PCI express (PCIe), or similar bus) and a network.

Memory controller 820 generally represents any type/form of device capable of handling memory or data or controlling communication between one or more components of computing system 800. In certain embodiments memory controller 820 may control communication between processor 855, memory 860, and I/O controller 835 via communication infrastructure 805. In certain embodiments, memory controller 820 may perform and/or be a means for performing, either alone or in combination with other elements, one or more of the operations or features described and/or illustrated herein. I/O controller 835 generally represents any type or form of module capable of coordinating and/or controlling the input and output functions of a computing device. For example, in certain embodiments I/O controller 835 may control or facilitate transfer of data between one or more elements of computing system 800, such as processor 855, memory 860, communication interface 845, display adapter 815, input interface 825, and storage interface 840.

Communication interface 845 broadly represents any type/form of communication device/adapter capable of facilitating communication between computing system 800 and other devices and may facilitate communication between computing system 800 and a private or public network. Examples of communication interface 845 include, a wired network interface (e.g., network interface card), a wireless network interface (e.g., a wireless network interface card), a modem, and any other suitable interface. Communication interface 845 may provide a direct connection to a remote server via a direct link to a network, such as the Internet, and may also indirectly provide such a connection through, for example, a local area network. Communication interface 845 may also represent a host adapter configured to facilitate communication between computing system 800 and additional network/storage devices via an external bus. Examples of host adapters include, Small Computer System Interface (SCSI) host adapters, Universal Serial Bus (USB) host adapters, Serial Advanced Technology Attachment (SATA), Serial Attached SCSI (SAS), Fibre Channel interface adapters, Ethernet adapters, etc.

Computing system 800 may also include at least one display device 810 coupled to communication infrastructure 805 via a display adapter 815 that generally represents any type or form of device capable of visually displaying information forwarded by display adapter 815. Display adapter 815 generally represents any type or form of device configured to forward graphics, text, and other data from communication infrastructure 805 (or from a frame buffer, as known in the art) for display on display device 810. Computing system 800 may also include at least one input device 830 coupled to communication infrastructure 805 via an input interface 825. Input device 830 generally represents any type or form of input device capable of providing input, either computer or human generated, to computing system 800. Examples of input device 830 include a keyboard, a pointing device, a speech recognition device, or any other input device.

Computing system 800 may also include storage device 850 coupled to communication infrastructure 805 via a storage interface 840. Storage device 850 generally represents any type or form of storage devices or mediums capable of storing data and/or other computer-readable instructions. For example, storage device 850 may include a magnetic disk drive (e.g., a so-called hard drive), a floppy disk drive, a magnetic tape drive, an optical disk drive, a flash drive, or the like. Storage interface 840 generally represents any type or form of interface or device for transmitting data between storage device 850, and other components of computing system 800. Storage device 850 may be configured to read from and/or write to a removable storage unit configured to store computer software, data, or other computer-readable information. Examples of suitable removable storage units include a floppy disk, a magnetic tape, an optical disk, a flash memory device, or the like. Storage device 850 may also include other similar structures or devices for allowing computer software, data, or other computer-readable instructions to be loaded into computing system 800. For example, storage device 850 may be configured to read and write software, data, or other computer-readable information. Storage device 850 may also be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from that shown in FIG. 8. Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in memory 860, and/or various portions of storage device 850. When executed by processor 855, a computer program loaded into computing system 800 may cause processor 855 to perform and/or be a means for performing the functions of one or more of the embodiments described/illustrated herein. Alternatively, one or more of the embodiments described and/or illustrated herein may be implemented in firmware and/or hardware.

Example Networking Environment

Figure 9:
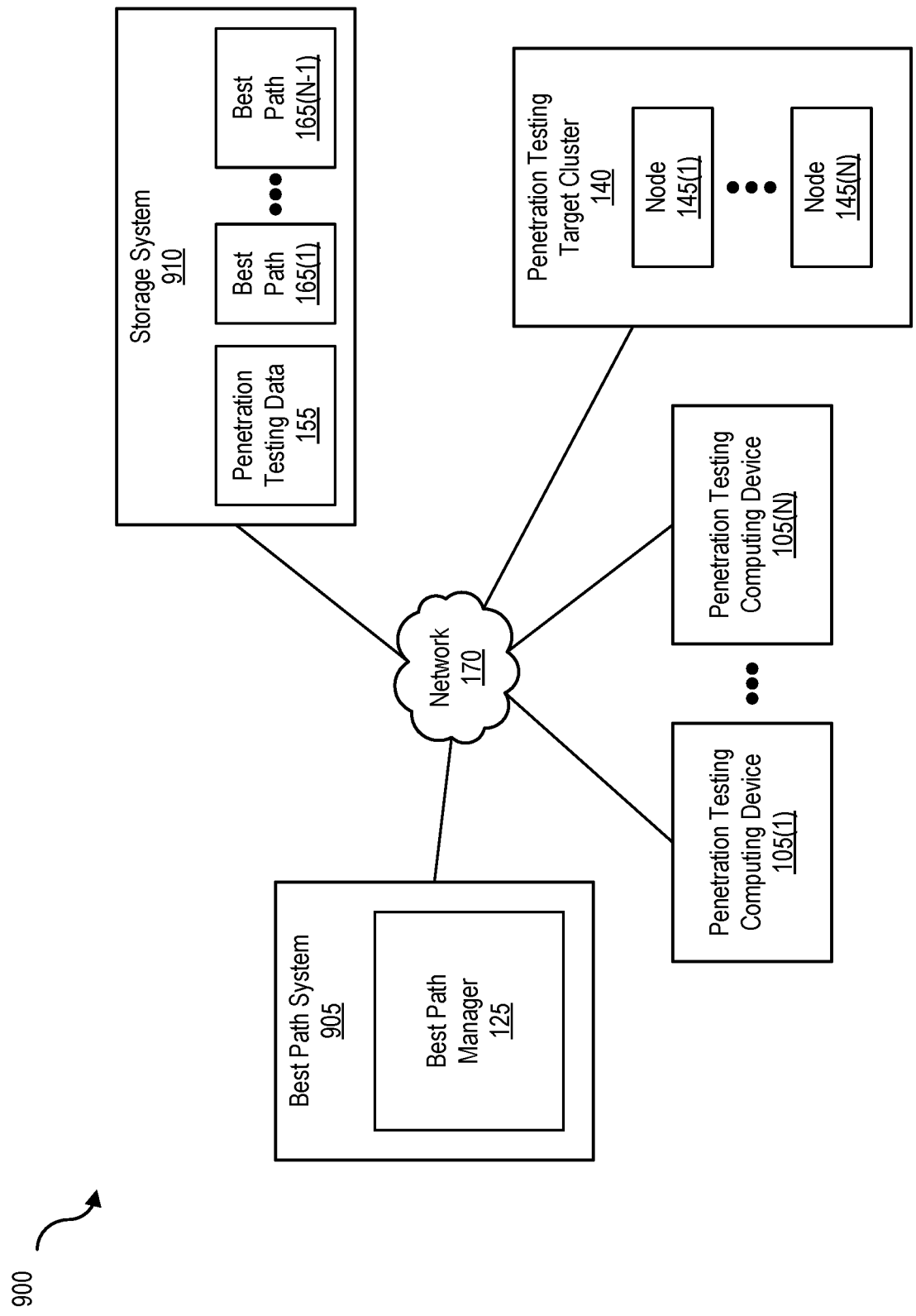
FIG. 9 is a block diagram 900 of a networked system, illustrating how various devices can communicate via a network, according to one embodiment of the present disclosure.

FIG. 9 is a block diagram of a networked system, illustrating how various computing devices can communicate via a network, according to one embodiment. Network 170 generally represents any type or form of computer network or architecture capable of facilitating communication between penetration testing computing devices 105(1)-(N), penetration testing target cluster 140, and/or best path system 905. For example, network 170 can be a Wide Area Network (WAN) (e.g., the Internet) or a Local Area Network (LAN).

In certain embodiments, a communication interface, such as communication interface 845 in FIG. 8, may be used to provide connectivity between penetration testing computing devices 105(1)-(N), penetration testing target cluster 140, and/or best path system 905, and network 170. The embodiments described and/or illustrated herein are not limited to the Internet or any particular network-based environment.

In some embodiments, best path system 905 may be part of penetration testing computing device 105 or penetration testing server 305, or may be separate. If separate, best path system 905 and penetration testing computing device 105 or penetration testing server 305 may be communicatively coupled via network 170. In one embodiment, all or a portion of one or more of the disclosed embodiments may be encoded as a computer program and loaded onto and executed by penetration testing computing device 105, penetration testing server 305, best path system 905, or any combination thereof, and may be stored on penetration testing computing device 105, penetration testing server 305, database 150, storage device 160, or best path system 905, and distributed over network 170.

In some examples, all or a portion of penetration testing computing device 105, penetration testing server 305, database 150, storage device 160, and/or best path system 905 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface.

Various functions described herein may be provided through a remote desktop environment or any other cloud-based computing environment. In addition, one or more of the components described herein may transform data, physical devices, and/or representations of physical devices from one form to another. For example, best path manager 125 may transform the behavior of penetration testing computing device 105, penetration testing server 305, or best path system 905 to perform dynamic best path determination for penetration testing.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method, comprising:
generating an action path for a phase of a penetration test, wherein
the action path comprises a kill chain,
the kill chain comprises a plurality of exploit actions, and the generating the action path comprises identifying one or more exploit actions of the plurality of exploit actions based on a weighted combination of exploit action attributes, wherein
the exploit action attributes comprise a penetration parameter, a detection parameter, and a time parameter associated with each of the one or more exploit actions,
the penetration parameter indicates a positive reward associated with a penetration test goal, and
the weighted combination negatively adjusts the reward based on the detection parameter and the time parameter;
determining that performance of the one or more identified exploit actions permits successful completion of the phase of the penetration test; and
based on the determining, designating the action path for inclusion as part of a best path for the penetration test.

2. The computer-implemented method of claim 1, further comprising:
performing a scan action to determine a topology of a network environment; and
storing the topology of the network environment, wherein the topology comprises metadata associated with a plurality of nodes operating in the network environment.

3. The computer-implemented method of claim 2, further comprising:
generating a next action path for a next phase of the penetration test, wherein
the next action path is part of the kill chain, and
the generating the next action path comprises adjusting the penetration parameter, the detection parameter, and/or the time parameter based on the metadata and the designation of the action path;
identifying one or more other exploit actions of the plurality of exploit actions based on the adjusted penetration parameter, the adjusted detection parameter, and/or the adjusted time parameter;
determining that performance of the one or more other exploit actions permits successful completion of the next phase of the penetration test; and
based on the determining, designating the next action path for inclusion as part of the best path for the penetration test.

4. The computer-implemented method of claim 1, wherein
the penetration parameter comprises one or more penetration attributes, wherein the one or more penetration attributes comprise at least a data attribute, a credentials attribute, and an exploit attribute,
the detection parameter comprises at least a detection attribute,
the time parameter indicates an execution time attribute associated with performing the one or more exploit actions,
the one or more penetration attributes are positive attributes, and
the detection attribute and the execution time attribute are negative attributes.

5. The computer-implemented method of claim 1, wherein
the determining that performance of the one or more identified exploit actions permits successful completion of the phase of the penetration test comprises receiving indication that the one or exploit actions identified as part of generating the action path result in a lowest risk of detection during performance of the penetration test.

6. The computer-implemented method of claim 3, wherein
the penetration test is performed by a penetration testing server, and
the penetration testing server is not part of the network environment.

7. The computer-implemented method of claim 3, further comprising generating the best path for the penetration test including:
configuring a penetration testing server to schedule performance of the next action path after performance of the action path; and
modifying the kill chain based on the scheduling.

8. The computer-implemented method of claim 1, wherein
the action path is one of a plurality of available action paths that permit successful completion of the phase of the penetration test, and
performing the one or more exploit actions comprised in the action path results in a lowest risk of detection during the penetration test compared to performing one or more other exploit actions comprised in one or more other action paths of the plurality of available action paths.

9. A non-transitory computer readable storage medium comprising program instructions executable to:
generate an action path for a phase of a penetration test, wherein
the action path comprises a kill chain,
the kill chain comprises a plurality of exploit actions, and the generating the action path comprises identifying one or more exploit actions of the plurality of exploit actions based on a weighted combination of exploit action attributes, wherein
the exploit action attributes comprise a penetration parameter, a detection parameter, and a time parameter associated with each of the one or more exploit actions,
the penetration parameter indicates a positive reward associated with a penetration test goal, and
the weighted combination negatively adjusts the reward based on the detection parameter and the time parameter;
determine that performance of the one or more identified exploit actions permits successful completion of the phase of the penetration test; and
based on the determining, designate the action path for inclusion as part of a best path for the penetration test.

10. The non-transitory computer readable storage medium of claim 9, wherein the program instructions executable to:
perform a scan action to determine a topology of a network environment; and
store the topology of the network environment, wherein the topology comprises metadata associated with a plurality of nodes operating in the network environment.

11. The non-transitory computer readable storage medium of claim 10, wherein the program instructions executable to:
generate a next action path for a next phase of the penetration test, wherein
the next action path is part of the kill chain, and the generating the next action path comprises adjusting the penetration parameter, the detection parameter, and/or the time parameter based on the metadata and the designation of the action path;
identify one or more other exploit actions of the plurality of exploit actions based on the adjusted penetration parameter, the adjusted detection parameter, and/or the adjusted time parameter;
determine that performance of the one or more other exploit actions permits successful completion of the next phase of the penetration test; and
based on the determining, designate the next action path for inclusion as part of the best path for the penetration test.

12. The non-transitory computer readable storage medium of claim 9, wherein
the penetration parameter comprises one or more penetration attributes, wherein the one or more penetration attributes comprise at least a data attribute, a credentials attribute, and an exploit attribute,
the detection parameter comprises at least a detection attribute,
the time parameter indicates an execution time attribute associated with performing the one or more exploit actions,
the one or more penetration attributes are positive attributes, and
the detection attribute and the execution time attribute are negative attributes.

13. The non-transitory computer readable storage medium of claim 9, wherein
the determining that performance of the one or more identified exploit actions permits successful completion of the phase of the penetration test comprises receiving indication that the one or exploit actions identified as part of generating the action path result in a lowest risk of detection during performance of the penetration test,
the action path is one of a plurality of available action paths that permit successful completion of the phase of the penetration test, and
performing the one or more exploit actions comprised in the action path results in a lowest risk of detection during the penetration test compared to performing one or more other exploit actions comprised in one or more other action paths of the plurality of available action paths.

14. The non-transitory computer readable storage medium of claim 11, wherein
the penetration test is performed by a penetration testing server,
the penetration testing server is not part of the network environment, and
the program instructions are executable to generate the best path for the penetration test including
configuring the penetration testing server to schedule performance of the next action path after performance of the action path, and
modifying the kill chain based on the scheduling.

15. A system comprising:
one or more processors; and
a memory coupled to the one or more processors, wherein the memory stores program instructions executable by the one or more processors to:
generate an action path for a phase of a penetration test, wherein
the action path comprises a kill chain,
the kill chain comprises a plurality of exploit actions, and the generating the action path comprises identifying one or more exploit actions of the plurality of exploit actions based on a weighted combination of exploit action attributes, wherein
the exploit action attributes comprise a penetration parameter, a detection parameter, and a time parameter associated with each of the one or more exploit actions,
the penetration parameter indicates a positive reward associated with a penetration test goal, and
the weighted combination negatively adjusts the reward based on the detection parameter and the time parameter;
determine that performance of the one or more identified exploit actions permits successful completion of the phase of the penetration test; and
based on the determining, designate the action path for inclusion as part of a best path for the penetration test.

16. The system of claim 15, wherein the program instructions are executable to:
perform a scan action to determine a topology of a network environment; and
store the topology of the network environment, wherein the topology comprises metadata associated with a plurality of nodes operating in the network environment.

17. The system of claim 16, wherein the program instructions are executable to:
generate a next action path for a next phase of the penetration test, wherein
the next action path is part of the kill chain, and
the generating the next action path comprises adjusting the penetration parameter, the detection parameter, and/or the time parameter based on the metadata and the designation of the action path;
identify one or more other exploit actions of the plurality of exploit actions based on the adjusted penetration parameter, the adjusted detection parameter, and/or the adjusted time parameter;
determine that performance of the one or more other exploit actions permits successful completion of the next phase of the penetration test; and
based on the determining, designate the next action path for inclusion as part of the best path for the penetration test.

18. The system of claim 15, wherein
the penetration parameter comprises one or more penetration attributes, wherein
the one or more penetration attributes comprise at least a data attribute, a credentials attribute, and an exploit attribute,
the detection parameter comprises at least a detection attribute,
the time parameter indicates an execution time attribute associated with performing the one or more exploit actions,
the one or more penetration attributes are positive attributes, and
the detection attribute and the execution time attribute are negative attributes.

19. The system of claim 15, wherein
the determining that performance of the one or more identified exploit actions permits successful completion of the phase of the penetration test comprises
receiving indication that the one or exploit actions identified as part of generating the action path result in a lowest risk of detection during performance of the penetration test,
the action path is one of a plurality of available action paths that permit successful completion of the phase of the penetration test, and
performing the one or more exploit actions comprised in the action path results in a lowest risk of detection during the penetration test compared to performing one or more other exploit actions comprised in one or more other action paths of the plurality of available action paths.

20. The system of claim 17, wherein
the penetration test is performed by a penetration testing server,
the penetration testing server is not part of the network environment, and
the program instructions are executable to generate the best path for the penetration test including to
configure the penetration testing server to schedule performance of the next action path after performance of the action path, and
modify the kill chain based on the scheduling.

* * * * *